United States Patent
Hüger et al.

(10) Patent No.: US 12,322,189 B2
(45) Date of Patent: Jun. 3, 2025

(54) METHOD AND GENERATOR FOR GENERATING DISTURBED INPUT DATA FOR A NEURAL NETWORK

(71) Applicants: Volkswagen Aktiengesellschaft, Wolfsburg (DE); Neurocat GmbH, Berlin (DE)

(72) Inventors: Fabian Hüger, Wolfenbüttel (DE); Peter Schlicht, Wolfsburg (DE); Nico Maurice Schmidt, Berlin (DE); Feix Assion, Berlin (DE); Florens Fabian Gressner, Berlin (DE)

(73) Assignees: VOLKSWAGEN AKTIENGESELLSCHAFT, Wolfsburg (DE); DSPACE GMBH, Paderborn (DE)

( * ) Notice: Subject to any disclaimer, the term of this patent is extended or adjusted under 35 U.S.C. 154(b) by 637 days.

(21) Appl. No.: 17/619,159

(22) PCT Filed: Jun. 12, 2020

(86) PCT No.: PCT/EP2020/066348
§ 371 (c)(1),
(2) Date: Dec. 14, 2021

(87) PCT Pub. No.: WO2020/249758
PCT Pub. Date: Dec. 17, 2020

(65) Prior Publication Data
US 2022/0358747 A1   Nov. 10, 2022

(30) Foreign Application Priority Data
Jun. 14, 2019   (DE) .............. 10 2019 208 733.7

(51) Int. Cl.
*G06V 20/58* (2022.01)
*G06V 10/764* (2022.01)
*G06V 10/82* (2022.01)

(52) U.S. Cl.
CPC .......... *G06V 20/58* (2022.01); *G06V 10/764* (2022.01); *G06V 10/82* (2022.01)

(58) Field of Classification Search
CPC ....... G06V 20/58; G06V 10/82; G06V 10/764
See application file for complete search history.

(56) References Cited

U.S. PATENT DOCUMENTS

2019/0180115 A1 *  6/2019  Zou ................... G06V 20/588
2020/0320769 A1 * 10/2020  Chen .................. G06F 18/214
(Continued)

FOREIGN PATENT DOCUMENTS

| CA | 3209044 A1 * | 11/2022 | ........... E21B 21/065 |
| WO | 2020/249758 A1 | 12/2020 | ............... G06K 9/00 |

OTHER PUBLICATIONS

Talukdar, Jonti et al., "Data Augmentation on Synthetic Images for Transfer Learning Using Deep CNNs," IEEE 5th International Conference on Signal Processing and Integrated Networks, pp. 215-219, Feb. 22, 2018.
(Continued)

*Primary Examiner* — Pinalben Patel
(74) *Attorney, Agent, or Firm* — Slayden Grubert Beard PLLC (57) ABSTRACT

The invention relates to a method for generating disturbed input data for a neural network for analyzing sensor data, in particular digital images, of a driver assistance system, in which a first metric is defined which indicates how the magnitude of a change in sensor data is measured, a second metric is defined which indicates where a disturbance of sensor data is directed, an optimization problem is generated
(Continued)

from a combination of the first metric and second metric, the optimization problem is solved by means of at least one solution algorithm, wherein the solution indicates a target disturbance of the input data, and disturbed input data is generated from sensor data for the neural network by means of the target disturbance.

20 Claims, 5 Drawing Sheets

(56) References Cited

U.S. PATENT DOCUMENTS

| | | | |
|---|---|---|---|
| 2021/0166085 A1* | 6/2021 | Schlicht | G06V 10/82 |
| 2022/0118989 A1* | 4/2022 | Hüger | G07C 5/008 |
| 2022/0155096 A1* | 5/2022 | Kim | G01C 21/3811 |
| 2022/0262103 A1* | 8/2022 | Gladisch | G06V 10/993 |

OTHER PUBLICATIONS

Shorten, Connor et al., "A Survey on Image Data Augmentation for Deep Learning," Journal of Big Data, vol. 6, No. 1, 48 pages, Jul. 6, 2019.

International Search Report and Written Opinion, Application No. PCT/EP2020/066348, 10 pages, Oct. 26, 2020.

* cited by examiner

METHOD AND GENERATOR FOR GENERATING DISTURBED INPUT DATA FOR A NEURAL NETWORK

CROSS-REFERENCE TO RELATED APPLICATIONS

This application claims priority to German Patent Application No. DE 10 2019 208 733.7, filed on Jun. 14, 2019 with the German Patent and Trademark Office. The contents of the aforesaid Patent Application are incorporated herein for all purposes.

TECHNICAL FIELD

The present invention relates to a method for generating disturbed input data for a neural network for analyzing sensor data, in particular for analyzing digital images, of a driver assistance system. The invention further relates to a method for checking the robustness of such a neural network and to a method for improving a parameter set of such a neural network. Moreover, the invention relates to a generator for generating disturbed input data for a neural network for analyzing sensor data, in particular for analyzing digital images, of a driver assistance system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles comprise driver assistance systems which support the driver in the controlling of the vehicle or partially or completely takes over the task of driving. By using such driver assistance systems, various levels of vehicle control automation may be achieved. At a low level of automation, only information and warnings are output to the driver. At higher levels of automation, the driver assistance system actively intervenes in the control of the vehicle. For example, the steering of the vehicle or the acceleration in the positive or negative direction is intervened with. In the case of an even higher level of automation, apparatuses of the vehicle are intervened with to such an extent that certain locomotion types of the vehicle, for example straight-ahead driving, may be executed automatically. At the highest level of automation, the vehicle may drive autonomously.

In such driver assistance systems, the analysis of digital images that are taken in the surroundings of the vehicle during the drive are of essential importance. The driver assistance system may only safely control the vehicle when the digital images are correctly analyzed. Machine learning has great potential in the analysis of digital images of a driver assistance system. The raw sensor data, which is generated, for example, by a camera, a radar sensor, or a lidar sensor of a vehicle, is processed by means of a deep neural network. The neural network generates output data, from which the driver assistance system derives relevant information for partially automated or fully automated driving. For example, the type and position of objects in the vicinity of the vehicle and their behavior are ascertained. Furthermore, the roadway geometry and roadway topology may be ascertained by means of neural networks. Convolutional neural networks are particularly suitable for processing digital images.

Such deep neural networks are trained for use in a driver assistance system. In this case, the parameters of the neural network may be suitably adapted through the input of data without a human expert needing to intervene. For a given parameterization, the deviation of an output of a neural network from a ground truth is measured. This deviation is also described as "loss." Here, what is known as a loss function is chosen in such a way that the parameters depend on it in a manner that may be differentiated. Using a gradient descent, in each training step the parameters of the neural network are then adapted depending on the derivation of the deviation, which is ascertained on the basis of multiple examples. These training steps are repeated very often until the deviation, i.e., the loss, no longer decreases.

In this approach, the parameters are ascertained without the assessment of a human expert or a semantically motivated model. For the neural networks, this means that they are often largely nontransparent for humans and their calculations cannot be interpreted. This leads to in particular deep neural networks often not being able to be systematically tested or formally verified.

Moreover, this results in the problem that deep neural networks are susceptible to harmful disruptive influences (adversarial perturbations). Small manipulations to the input data that are barely perceptible or not perceptible at all to humans or manipulations that do not change the situational assessment may lead to output data that differs considerably from the output data that would have resulted without the manipulation. Such manipulations may be either changes to the sensor data caused maliciously or randomly occurring image changes due to sensor noise, weather influences, or certain colors and contrasts.

It cannot be predicted to which input features a neural network reacts so sensitively that the output data changes considerably even in the case of small changes to the input data. This means that synthetic data cannot be used successfully for training neural networks used in such driver assistance systems. It has been shown that neural networks that have been trained in simulations or on otherwise synthetic data perform poorly when used in a driver assistance system with real sensor data. It has also been shown that executing a driver assistance system with a neural network in a different domain may also starkly reduce the functional quality. For example, it may occur that a driver assistance system with a neural network that was trained in the summer is unsuitable for execution in the winter. The development and approval of neural networks for driver assistance systems on the basis of a simulation is therefore problematic.

There is therefore a need to develop neural networks for driver assistance systems which are robust against disturbances. The neural networks should then also generate usable output data for the driver assistance system when the input data is disturbed.

To achieve this, it is known to generate disturbed input data for a neural network by means of known disturbances and test how the output data of the neural network reacts to this disturbed input data. There are collections for disturbances of the input data, by means of which it may be tested how robust a neural network is against such disturbances. However, this results in the problem that disturbed input data may only be generated to a limited extent by known disturbances. There is therefore a need to generate disturbed input data for a neural network for analyzing sensor data, in particular digital images, of a driver assistance system in order to test and improve neural networks.

SUMMARY

A need exists to provide a method and a generator for generating disturbed input data for a neural network for analyzing sensor data of a driver assistance system, with which new disturbed input data for the neural network may be generated in a simple manner.

The need is addressed by methods and generators having the features of the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a method according to a first exemplary aspect for generating disturbed input data for a neural network for analyzing sensor data of a drive assistance system, a first metric is defined which indicates how the magnitude of a change of a digital image is measured, and a second metric is defined which indicates where a disturbance of the input data is directed. An optimization problem is generated from a combination of the first metric and the second metric. The optimization problem is solved by means of at least one solution algorithm, wherein the solution indicates a target disturbance of the input data, and input data disturbed by means of the target disturbance is generated from sensor data for the neural network.

The sensor data is in particular digital images. In this case, the target disturbance thus generates disturbed, i.e., changed digital images, which form the input data for the neural network that analyzes the digital image.

In the method according to this exemplary aspect, possible harmful disturbances of a neural network which is used to analyze sensor data are considered at a structural level. The disturbance is considered as a composition of various elements for which various metrics are defined. Surprisingly, it was achieved as a result that no longer only randomly composed disturbances are used, but rather it is possible to generate a large number of new harmful target disturbances on the basis of known disturbances by analyzing the structure of known disturbances with regard to the metrics.

In the method according to this exemplary aspect, an optimization problem is generated from two metrics which measure changes in sensor data, in particular in a digital image. For such an optimization problem, there are a large number of known solution algorithms. The optimization problem may thus be solved with these solution algorithms. As a result, a target disturbance of the input data is generated. By means of this target disturbance, disturbed input data may then be generated from sensor data for the neural network. The neural network may then be tested and trained on the basis of this disturbed input data. The method enables new disturbances to be generated very quickly and simply.

The first metric used in the method according to this exemplary aspect indicates how the magnitude of a change in sensor data is measured. If the sensor data is a digital image from a camera, the disturbance should usually be as small as possible to test the neural network. The first metric indicates how the magnitude of the change in the digital image may be quantified. A digital image may, for example, be changed in that the pixels of the image are shifted, rotated, or mirrored. The first metric indicates the magnitude of the change in the case of such transformations. According to the first metric, a rotation or translation of a digital image may be defined by a fixed point, and the rotation angle or the translation distance in the horizontal and vertical direction, respectively. Furthermore, for each pixel in the image, the first metric may determine the image distances in that the sum of the differences of all pixel values is ascertained. The pixel value may be a gray scale value and or a color value, for example. For each pixel, the difference of the pixel value for the original image and for the disturbed image is formed. This difference is determined for each pixel and the differences are then added. The result is an image distance which indicates the difference of the two images according to the first metric.

Moreover, according to the first metric, changed image regions may be considered. The image regions may be defined by a starting point and an extension in the horizontal and vertical directions, or by a list of pixels. According to the first metric, image distances may be determined for these image regions.

Moreover, the first metric may indicate the magnitude of a change in a digital image with reference to image characteristics, such as luminance, contrast, and/or structure values, or any combinations thereof.

The definition of the first metric may also contain limitations, for example that the changes that are considered in the first metric take into account only such image regions in which, for example, specific image characteristics are present. For example, only such regions in which the contrast exceeds a specific threshold may be considered.

In some embodiments, the first metric is selected from first metrics that measure potential naturally occurring disturbances, because disturbances ascertained by these metrics may actually occur during execution in the field. Such natural disturbances are, for example, changes in the sensor data that are generated due to weather influences, such as fog or snow, sensor noise, or by a dirty camera, or that are generated by textures. Furthermore, naturally occurring disturbances are naturally occurring objects in the surroundings of a vehicle, such as printed posters or stickers on objects. If, for example, the disturbance of the second metric is directed at making objects of a specific class disappear, it is possible to add a printed poster, a sticker on an object, fog, or textures to a digital image. By means of such disturbances, which according to the second metric is directed at a specific effect in the sensor data, such disturbed input data may be generated for a neural network, which disturbed input data is particularly relevant for the use in a driver assistance system.

In some embodiments, the second metric is directed at a change in the classification of objects. It measures in particular the deviation of the true model output from the desired false model output, meaning the target of the adversarial disturbance. In a digital image, for example, small image regions or a small number of pixels may be disturbed so that an object in the digital image is no longer detected as a traffic participant, such as a pedestrian, but instead as another classified object, for example a region of a roadway. Furthermore, the disturbance may be directed at, whenever a region is detected as a road, this road always being detected as an empty road without other traffic participants.

In some embodiments, the second metric may be directed at a disappearance of objects. The disturbance is, for example, directed at changing detected objects so that they disappear. The second metric may also relate here only to specific image regions. For example, the disturbance described by the second metric may be directed at objects of a specific class not being able to be present in a specific image region.

In some embodiments of the method, the second metric is directed at a change in an object of a specific class. For example, an object may be detected and classified. For example, an image region may be assigned to a traffic participant. The second metric is then, for example, directed at showing this object larger or smaller or at a different position. For example, objects classified as pedestrians may be shown smaller or larger. In this case, the enlargement is defined, for example, by the absolute indication of pixels through which the object is enlarged or shrunk to the left, right, top, and bottom by the disturbance.

There are a large number of possible disturbances that may be described by the second metric. Any changes to the sensor data could be caused to change the sensor data such that, in the analysis of the sensor data in a driver assistance system, results relevant to safety in particular may longer be achieved correctly. For example, a pattern or a raster may be applied to the sensor data so that objects of a specific class, for example, pedestrians, in a digital image disappear but other objects continue to be correctly classified. For the application of the method according to the present exemplary aspect in a driver assistance system, in particular such second metrics are relevant that measure the naturally appearing disturbances: the model output appears plausible but deviates from the truth in specific, safety-relevant details.

In some embodiments, the disturbances that are described by the first and/or second metric are naturally occurring disturbances. For the application in a driver assistance system, a selection is thus made for the possible disturbances that are described by the first and/or second metric that are particularly relevant for checking and improving neural networks for use in a driver assistance system.

In some embodiments, the first and/or second metrics are stored in a database. A data set on a naturally occurring disturbance that is measured with the first and/or second metric is then loaded from the database. The metrics for possible disturbances to the input data (first metrics) and for possible changes to the model outputs (second metrics) may be stored, for example, in the database. According to some embodiments, a data set on a naturally occurring disturbance (measured with a first metric) and for a possible target (a notified change in the model output—e.g., overlooking all pedestrians—measured with a second metric) is then loaded from the database.

In some embodiments, a third metric is defined, which indicates what kind of sensor data a third disturbance is applied to. For example, if the disturbance is applied to all data, to only one data point, or to data with specific conditions, for example for all data with multi-lane roads. The optimization problem is then generated from a combination of at least two metrics of the first, the second, and the third metric. The optimization problem is in particular generated from a combination of the first, the second, and the third metric. The sensor data is in particular digital images. These are analyzed in particular by a neural network in a driver assistance system.

The third metric may relate in particular to all sensor data, for example all digital images. For example, the disturbance may result, in all digital images, in objects of a specific class disappearing.

Furthermore, the third metric may have an impact only on a subset of the sensor data, in particular of the digital images. The disturbance may describe, for example, only such digital images that contain objects of a specific class, for example objects classified as pedestrians. Furthermore, the third metric may describe digital images that were taken on days with snowfall or rain. As a result, the disturbed input data for the neural network in a use in a driver assistance system may effect, for example, a different evaluation of a special traffic situation or environmental situation.

In some embodiments, the third metric describes only sensor data that contain a specific object. Alternatively or additionally, the third metric may select only one specific digital image.

The optimization problem which has been generated on the basis of the metrics may be shown, for example, as follows: In a specified maximum change in a digital image, for example, by rotating a specific image region, the number of pixels classified as persons should be minimized, for as many images as possible in which persons are present.

In another example, in a minimum change in the starting image in regions with high contrast, the number of pixels classified as persons should be minimized, for as many images as possible in which persons are present.

For such optimization problems, a solution algorithm is indicated in the method according to this exemplary aspect. In some embodiments, the solution algorithm comprises iterative methods using the gradients of the neural network for determining the change directions. Furthermore, iterative methods using sampling, evaluation, and combinations thereof are used.

In some embodiments, a Monte Carlo method is used as a solution algorithm, in which, for example, a noise is generated for a digital image, and the result is checked. In some embodiments, a genetic algorithm may be used for solving the optimization problem.

The solution to the optimization problem may be, for example, a disturbed digital image or a disturbance with which sensor data may be disturbed to generate disturbed input data for a neural network. The disturbed sensor data or the disturbed digital image are then the input data for the neural network which is to be checked. A disturbance may also be applied to a set of input data by combination at the pixel level, for example by summation.

Another exemplary aspect relates to a method for generating disturbed input data for a neural network for analyzing sensor data, in particular digital images, of a driver assistance system, in which a first quantity is defined that contains the first metrics, which each differently indicate how the magnitude of a change in sensor data is measured, a second quantity is defined that contains second metrics, which each differently indicate where a disturbance of sensor data is directed, any combination of a first metric of the first quantity and a second metric of the second quantity is chosen, an optimization problem is generated from the chosen combination of the first and second metric, the optimization problem is solved by means of at least one solution algorithm, wherein the solution indicates a target disturbance of the input data, and disturbed input data are generated by means of the target disturbance from sensor data for the neural network.

A benefit of this method is that any first metric of the first quantity and any second metric of the second quantity may be used to get to a target disturbance by solving the optimization problem. The more metrics the first and second quantities contain, the more different target disturbances may be generated by the method. A large number of target disturbances may thus be generated.

In some embodiments, the first quantity comprises at least two, in particular at least five, different first metrics. However, the first metric may also contain more than 10, 20, or more than 100 metrics.

According to some embodiments, the second quantity comprises at least two, in particular at least five, different second metrics. However, the second metric may also contain more than 10, 20, or more than 100 metrics.

The first and/or the second metric of the first and/or second quantity, respectively, may in particular have the features as described above, individually or in combination.

In some embodiments, a third metric is defined, which indicates what kind of sensor data a disturbance is applied to, and any combination of a first metric of the first quantity, a second metric of the second quantity, and the third metric is chosen. From the chosen combination of the first, second, and third metric, an optimization problem is then generated.

The third metric may have in particular the features as described above, individually or in combination.

In some embodiments, a solution algorithm quantity is defined that contains multiple solution algorithms that each solve the optimization problem differently in order to generate different target disturbances of the input data. Any one solution algorithm of the solution algorithm quantity is then selected in order to generate disturbed input data from sensor data for the neural network. In this manner, an even larger number of target disturbances may be generated, because the solution algorithm may also be varied, wherein each solution algorithm comes to different target disturbances.

The solution algorithms of the solution algorithm quantity may comprise iterative methods using the gradients of the neural network for determining the change directions as well as sampling-based methods, gradient-based methods with momentum, and/or surrogate model-based methods.

The teachings herein also relate to a method for checking the robustness of a neural network for analyzing sensor data, in particular digital images, against disturbed input data, in which the following steps are performed: providing a neural network having an associated parameter set, generating training data by means of an example sensor data set, generating a first analysis of the example sensor data set on the basis of the training data by means of the neural network, generating disturbed input data as training data for the example sensor data set by means of the method described in the preceding for generating disturbed input data for a neural network, generating a second analysis of the example sensor data set on the basis of the disturbed input data by means of the neural network, comparing the first and second analysis, and ascertaining a robustness value depending on the result of the comparison of the first and second analysis.

The teachings herein also relate to a method for improving a parameter set of a neural network for analyzing sensor data, in particular digital images, in relation to disturbed input data. With the method, the following steps are performed:

a. providing a neural network having the associated parameter set,
b. generating training data by means of an example sensor data set,
c. generating a first analysis of the example data set on the basis of the training data by means of the neural network,
d. generating disturbed input data as training data for the example sensor data set by means of the method described in the preceding for generating disturbed input data for a neural network,
e. generating a second analysis of the example sensor data set on the basis of the disturbed input data by means of the neural network,
f. comparing the first and second analysis, and
g. ascertaining a robustness value depending on the result of the comparison of the first and second analysis.

The example sensor data set is in particular a digital example image.

By means of the method, the method described at the outset for generating disturbed input data may be used to check how robust a neural network for analyzing sensor data is against the disturbed input data. If the neural network is used in a method for analyzing sensor data for a driver assistance system, it is important for safety when operating the vehicle which the driver assistance system is affecting that the neural network is robust against disturbed input data for the neural network. The neural network is robust against such disturbed input data when the deviation in the first and the second analysis is very low. The disturbed input data then has a low influence on the output of the neural network. However, when the disturbed input data lead to a very large deviation of the second analysis of the example sensor data set from the first analysis, even if the disturbances to the sensor data are only very small, the neural network is not robust against the disturbance of the input data.

If the sensor data is digital images, the first and second analysis may comprise semantic segmentation of the digital image, detecting objects in the digital image, classifying objects in the digital image, or detecting the position of an object in the digital image. In addition, it may be detected by means of the analyses how an object in the digital image changes. These analyses are particularly relevant in a use of the neural network in a driver assistance system, so that it is important that the neural network is robust against disturbances that may occur in such analyses, and thus that small changes occur in the analysis when disturbed input data is used.

The teachings herein also relate to a method for improving a parameter set of a neural network for analyzing sensor data, in particular digital images, in relation to disturbed input data. The method comprises the steps a. to f., as indicated in the preceding. Then, in a step h., an improved parameter set for the neural network is generated on the basis of the result of the comparison of the first and second analysis.

The improved parameter set is obtained by training the neural network. The training is performed for disturbed and undisturbed sensor data, i.e., in particular digital images. The improved parameter set then results, for example, from a gradient descent (adversarial training).

Moreover, the teachings herein relate to a generator for generating disturbed input data for a neural network for analyzing sensor data, in particular digital images, of a driver assistance system with a first metric unit with a first metric, which indicates how the magnitude of a change in sensor data is measured, a second metric unit with a second metric, which indicates where a disturbance of the input data is directed, a processing unit, which is coupled to the first and second metric unit and is designed to generate an optimization problem from the first and the second metric, a solution unit, which is coupled to the processing unit and is designed to solve the optimization problem by means of at least one solution algorithm, wherein the solution indicates a target disturbance of the input data from sensor data, and a generating unit, which is coupled to the solution unit and is designed to generate disturbed input data from sensor data for a neural network by means of the target disturbance.

The generator is designed in particular to carry out the method described in the preceding for generating disturbed input data. It therefore has the same benefits as this method.

In some embodiments, the generator also comprises a third metric unit with a third metric, which indicates what kind of sensor data the disturbance is applied to. In this case, the processing unit is also coupled to the third metric unit and designed to generate the optimization problem from at least two metrics of the first, the second, and the third metric.

Moreover, the teachings herein relate to a device for generating a parameter set for a neural network for analyzing sensor data of a driver assistance system with a first analysis unit for generating a first analysis by means of the neural network on the basis of training data for an example sensor data set, the generator described in the preceding for generating disturbed input data for generating disturbed input data as training data for the example sensor data set, a second analysis unit for generating a second analysis of the example sensor data set on the basis of the disturbed input data by means of the neural network, a comparison unit which is coupled to the first and the second analysis unit and which is designed to compare the first and second analysis, and a generating unit which is coupled to the comparison unit and is designed to generate an improved parameter set for the neural network on the basis of the result of the comparison of the first and second analysis.

The device for generating a parameter set is designed in particular to carry out the method described in the preceding for improving a parameter set of a neural network. It therefore has the same benefits as this method.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

In the exemplary embodiments, sensor data is analyzed by a neural network or disturbed input data for a neural network is generated from such sensor data. The sensor data in the exemplary embodiments is raw data from sensors in a vehicle. The sensor may be a camera, a radar sensor, a lidar sensor, or any other sensor which generates sensor data which is processed further in a driver assistance system. In the following, it is assumed as an example that the sensor data is digital images which have been taken by a camera of a vehicle. The invention, however, may also be applied to other sensor data in the same manner.

Figure 1:
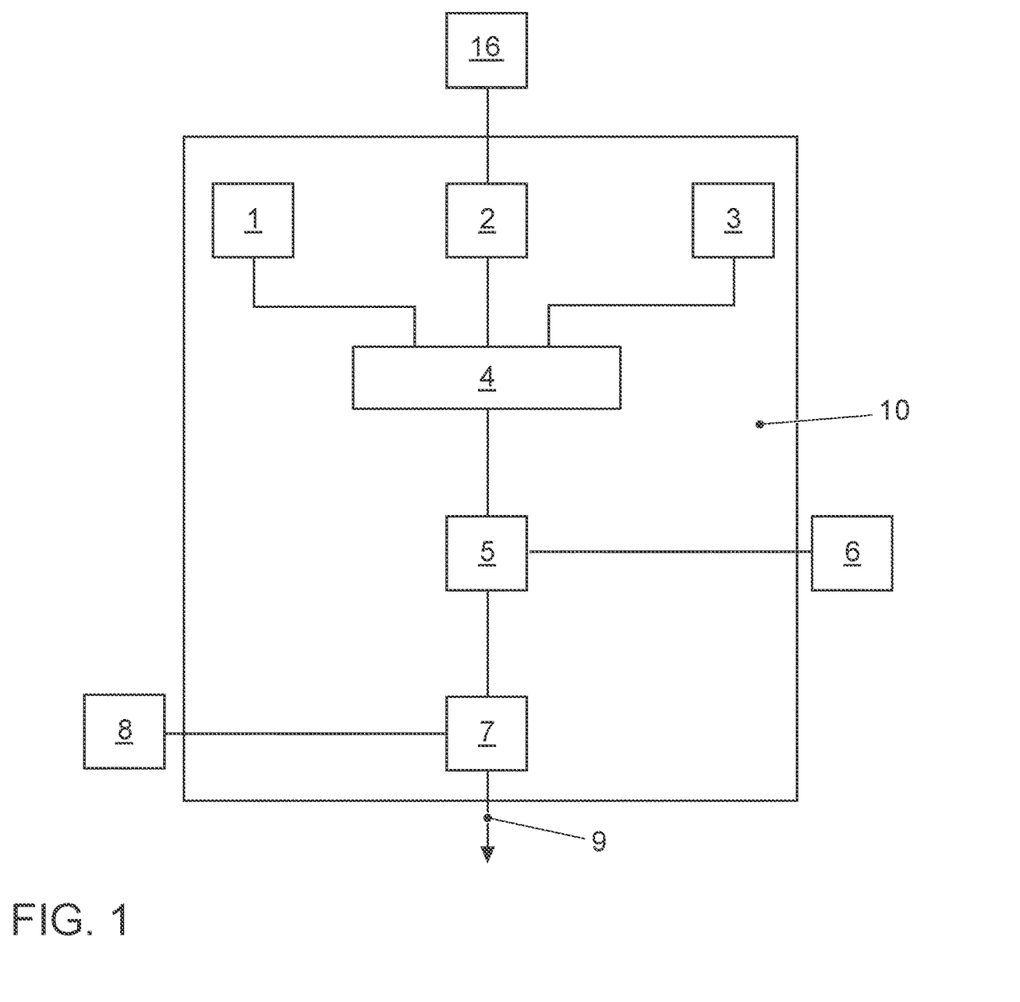
FIG. 1 schematically shows an exemplary embodiment of a generator.

With reference to FIG. 1, an exemplary embodiment of the generator 10 for generating disturbed input data for a neural network for analyzing digital images of a driver assistance system is first described.

The generator 10 comprises a first metric unit 1, a second metric unit 2, and a third metric unit 3. The first metric unit 1 comprises a first metric, which indicates how the magnitude of a change in digital images is measured. It is defined by the first metric unit 1 how the magnitude of a change in digital images is measured. The definition of the first metric may be input into the first metric unit 1. However, via an interface, the first metric unit 1 may also access a database 16 in which data with a plurality of possible definitions for metrics that measure the magnitude of a change in digital images is stored. For example, the first metric may compare the image distances of two digital images and output a value for this image distance. The image distance may be defined, for example, by the sum of the differences of all pixel values of the digital images to be compared.

In the exemplary embodiment, the first metric unit 1 selects a disturbance that is as natural as possible from the database 16. A natural disturbance is understood to mean a disturbance which influences digital images of the surroundings of a vehicle in the same way as may also occur due to naturally occurring phenomena in the surroundings of the vehicle. The change in a digital image due to a natural disturbance corresponds, for example, to the change in a digital image as results upon the occurrence of weather phenomena, such as upon the occurrence of fog, snowfall, or rain. Furthermore, natural disturbances are understood to mean image changes in which objects are added to the image or disappear from the image as may also occur in the surroundings of a vehicle. For example, in the vicinity of the vehicle, a poster or a sticker may be added to an object. Other, non-naturally occurring disturbances, as may also be contained in the database 16, are not taken into account by the second metric unit 2, because they are of little relevance for the check of a neural network that is used in a driver assistance system.

The second metric unit 2 comprises a second metric, which indicates where a disturbance of the input data of the digital images is directed, i.e., the second metric defines where a disturbance of a digital image is directed. The definition of the second metric may be transferred by an input to the second metric unit 2. In the same way, the second metric unit 2 may also be coupled to the database 16 in which data regarding a plurality of disturbances is stored which is directed at a specific change in digital images. This may be collections of such disturbances.

In the exemplary embodiment, the second metric unit 2 selects a disturbance that is as plausible as possible from the database 16. A plausible disturbance is understood to mean a disturbance which results in seemingly realistic model output but differs from it in relevant details. In the case of a plausible disturbance, a correct segmentation, for example, takes place, in which, however, the lane markings have been consistently shifted. Other, non-plausible disturbances, as may also be contained in the database 16, are not taken into account by the second metric unit 2, because they are of little relevance for the check of a neural network that is used in a driver assistance system. Severely implausible model outputs may namely be detected easily.

The second metric may be directed, for example, at enlarging the size of all objects that are assigned to a specific class, for example the class of pedestrians. The disturbance thus generates a digital image in which an object in the starting image that is classified as a pedestrian is enlarged iteratively in all four directions, wherein the resulting segmentation of the disturbed digital image is combined again. The result is a digital image in which all objects that do not belong to the class of pedestrians remained unchanged, but the objects that belong to the class of pedestrians are shown enlarged. The other objects are only changed insofar as they have been changed by the enlargement of the objects of the class of pedestrians.

The third metric unit 3 comprises the third metric, which indicates what kind of digital images the disturbance is applied to. For example, it may be defined by the metric that the disturbance is only applied to digital images that show other traffic participants, i.e., for example, pedestrians, cyclists, and other vehicles.

The three metric units 1 to 3 are connected to a processing unit 4. The processing unit 4 is designed to generate an optimization problem from the three metrics of the first through third metric units 1 to 3. The optimization problem comprises, for example, a loss function for a neural network, which contains as a parameter a disturbance parameter and an image resulting from the disturbance (second metric). In the case of the optimization problem, the minimum of the disturbance parameter should be found, for the digital images that are defined according to the third metric and under the condition that the magnitude of the change of the generated image relative to the starting image according to the first metric is below a specific value.

The processing unit 4 transfers the optimization problem as a data set to a solution unit 5. The solution unit 5 is coupled to a database 6 in which at least one solution algorithm, for example a plurality of solution algorithms, for optimization problems are stored. Such solution algorithms are generally known. For example, Monte Carlo methods, genetic algorithms, and/or gradient-based methods may be stored in the database 6 and may be accessed by the solution unit 5. By means of these solution algorithms, the solution unit 5 may generate a target disturbance of the input data of digital images as the solution to the optimization problem. The target disturbance thus generates a disturbed digital image, which may be used as input data for a neural network for analyzing digital images. The neural network is in particular configured to analyze digital images of a driver assistance system.

The solution unit 5 transfers the target disturbance to a generating unit 7. The generating unit 7 is also coupled to a database 8, in which a plurality of digital images are stored.

By means of the target disturbance, the generating unit 7 may disturb digital images of the database 8 such that disturbed input data 9 of the digital images for a neural network is generated. The disturbed input data 9 is then output from the generating unit 7. With this disturbed input data 9, a neural network may then be tested, trained, or the parameter set of the neural network may be improved.

Figure 2:
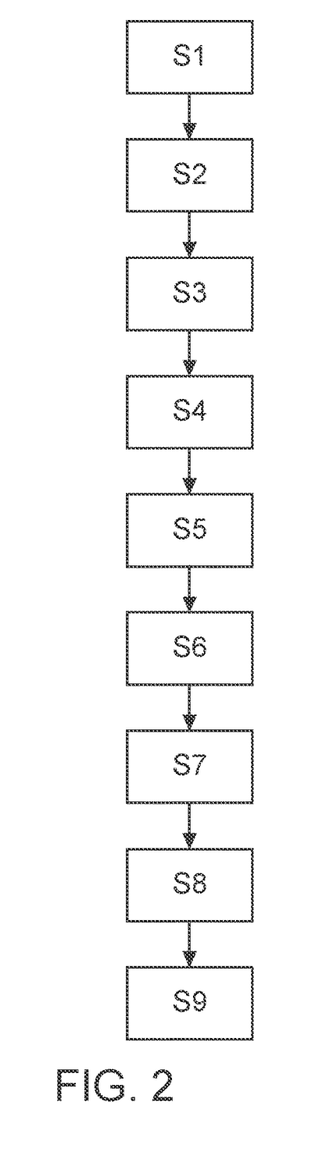
FIG. 2 schematically shows an exemplary embodiment of a method for generating disturbed input data.

An exemplary embodiment of the method for generating disturbed input data 9 will be explained with reference to FIG. 2:

In a step S1, a first metric is defined, which indicates how the magnitude of a change in digital images is measured. The first metric, or a data set that describes the first metric, is stored in the first metric unit 1.

In a step S2, a second metric is defined, which indicates where a disturbance of the digital images is directed. This second metric, or a data set that describes the second metric, is also stored in the second metric unit 2.

Finally, in a step S3, the third metric is defined, which indicates what kind of digital images a disturbance is applied to. This third metric, or a data set that describes the first metric, is stored in the third metric unit 3.

In a step S4, the data sets that describe the three metrics are transferred to the processing unit 4.

In a step S5, the processing unit 4 generates an optimization problem from a combination of the three metrics. In a step S6, the processing unit 4 transfers a data set that describes the generated optimization problem to the solution unit 5.

In a step S7, the solution unit 5 solves the optimization problem by means of at least one solution algorithm, which has been transferred to the solution unit 5, for example, through access to the database 6. The solution is a target disturbance for digital images.

In a step S8, a data set for this target disturbance is transferred to the generating unit 7.

In a step S9, the generating unit 7 generates disturbed digital images as input data 9 for a neural network through access to the database 8. This disturbed input data 9 is output in a step S10.

Figure 6A:
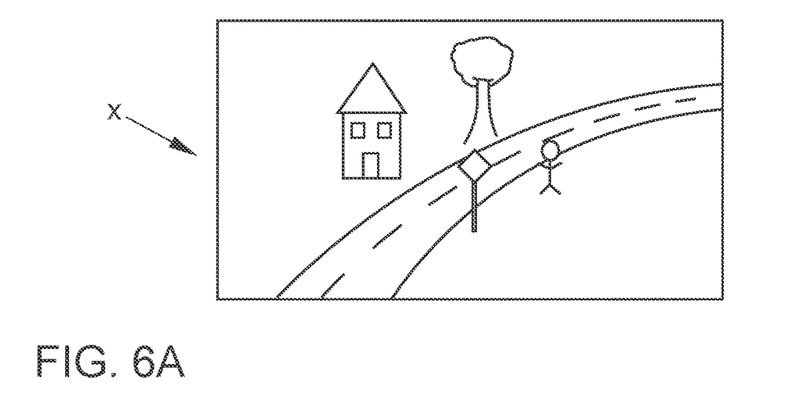
FIGS. 6A-6C show an example of a disturbance.

In the following, the method will be explained in detail with reference to FIGS. 6A to 6C using an example in which objects of the class of pedestrians are enlarged:

A model M is given. For this model, there is the input x. This input x is a digital image, as it is shown in FIG. 6A. Moreover, the output M(x)=y is defined. A disturbance is described with $\Delta$, so that x'=x+$\Delta$ results as changed input. The changed output is then y'=M(x+$\Delta$). The target output is described with y".

Figure 6B:
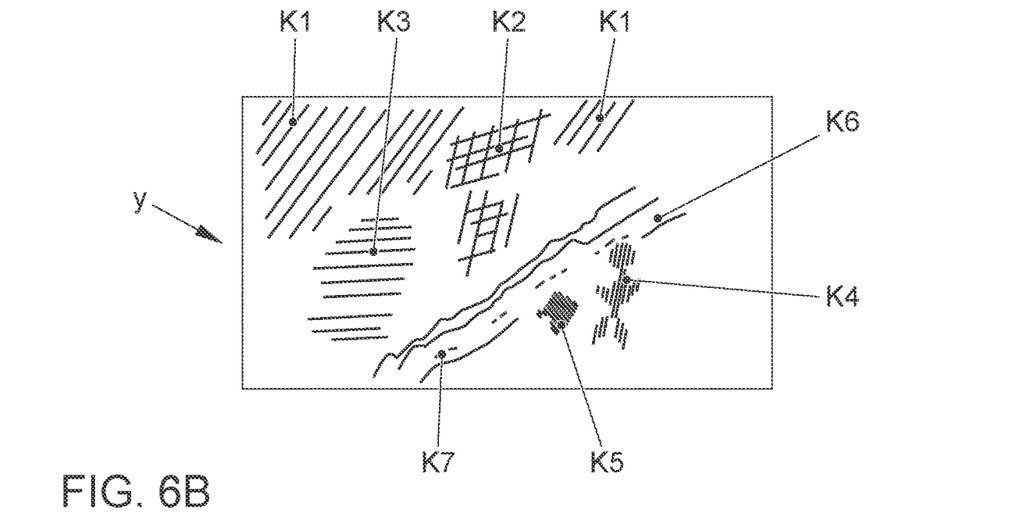

In FIG. 6B, the output y of the model M is shown. The digital image x was segmented, i.e., the pixels of the digital image x were, as shown in FIG. 6B, assigned classes. The following class assignments have thereby resulted:

K1: Sky;
K2: Nature;
K3: Building;
K4: Pedestrian;
K5: Traffic sign;
K6: Road;
K7: Marking.

Figure 6C:
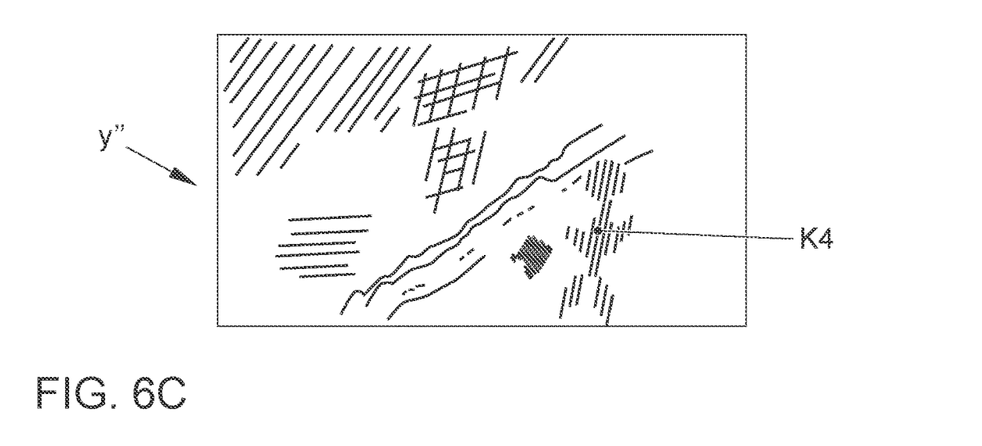

The target output y" that should be generated by the disturbance $\Delta$ is shown in FIG. 6C. The target of the disturbance $\Delta$ is to shown the pedestrian enlarged. It is defined as a target disturbance that at most a shift of individual pixel values by the value of 3 may take place. The target data consists of a concrete image x.

The first metric is then defined as follows:

$$d_1(\Delta) = \|\Delta\|_\infty \max_{pixel} |\Delta(\text{pixel})|$$

The size of the disturbance is thus measured as the maximum pixel value between 0 and 255 in the disturbance $\Delta$.

The second metric is defined as follows:

$$d_2(\Delta) = \|M(x+\Delta) - y''\|_1 = \|y' - y''\|_1$$
$$= \sum_{pixel} |y'(\text{pixel}) - y''(\text{pixel})|$$

It defines the sum of the pixel deviations from the target output.

The third metric is defined as follows:

$$d_3(x') = \begin{cases} 0; x' = x \\ 1; x' \neq x \end{cases}$$

Thus, according to this third metric, only the input image x has a small size. Consequently, the attack only relates to the input image x when $d_3(x')<1$ is demanded. The focus with regard to the data to be attacked changes dramatically when $d_3(x')<2$ is demanded: then the attack relates to all images.

From these three metrics, the optimization problem is then formed as follows:

$$\overline{\Delta} = \underset{d_1<3, d_3(x')<1}{\operatorname{argmin}} (d_2(\Delta))$$

According to the optimization problem, a $\Delta$ should be found so that $d_2(\Delta)$ is minimal, wherein $d_1(\Delta)<3$ is at x.

This optimization problem may be solved using generally known solution algorithms. Because of this, a new adversarial disturbance is obtained from already known ($d_1$, $d_3$) and novel ($d_2$) metrics. New adversarial disturbances also arise by recombining already known metrics ($d_1, \ldots, d_3$) in a novel manner or their connection with another solution algorithm. The method thus allows a design of effectively any number of novel adversarial disturbances in a simple manner.

According to a variant of this example, in the first metric, only pixel changes in an image region may be permitted that are classified as "tree." The following then results as an optimization problem: A $\Delta$ should be found in image regions "tree" in the digital image x so that $d_2(\Delta)$ is minimal, wherein $d_1(\Delta)<3$.

According to another variation of this example, for the third metric, a disturbance may be searched for all images, wherein the first metric $d_1$ and the second metric $d_2$ are left unchanged. The optimization problem may then be formulated as follows: A $\Delta$ should be found so that $d_2(\Delta)$ is minimal for all images, wherein $d_1(\Delta)<3$. In other words, a $\Delta$ with $d_1(\Delta)<3$ should be found so that the model output for all input images x looks like y".

In the following, another exemplary embodiment of the generator 10 and the method for generating disturbed input data 9 will be explained:

The generator 10 of the further exemplary embodiment comprises, as in the first exemplary embodiment, a first metric unit 1 and a second metric unit 2. In this case, however, the first metric unit 1 comprises a first quantity with a plurality of first metrics, which each differently indicate how the magnitude of a change in sensor data is measured. In this case, the second metric unit 2 comprises a second quantity with a plurality of second metrics, which each differently indicate where a disturbance of input data 9 from sensor data is directed. The processing unit 4 coupled to the first 1 and the second 2 metric unit is designed in this case to generate the optimization problem from any combination of a first metric of the first quantity and a second metric of the second quantity.

The solution unit 5 coupled to the processing unit 4 is then designed to solve the optimization problem by means of at least one solution algorithm, wherein the solution indicates a target disturbance of the input data 9 from sensor data. Analogously to the first exemplary embodiment, the generating unit 7 is also designed to generate disturbed input data 9 from sensor data for a neural network 11 by means of the target disturbance.

The method of the further exemplary embodiment runs analogously to the method of the first exemplary embodiment. However, in this case a first quantity is defined which contains the first metrics, which each differently indicate how the magnitude of a change in sensor data is measured. Furthermore, a second quantity is defined which contains the second metrics, which each differently indicate where a disturbance of sensor data is directed. Any combination of a first metric of the first quantity and a second metric of the second quantity is then chosen and the optimization problem is generated from the chosen combination of the first and second metric. This is then, as in the method of the first exemplary embodiment, solved by means of at least one solution algorithm, wherein the solution indicates a target disturbance of the input data 9. By means of the target disturbance, disturbed input data 9 is then generated from sensor data for the neural network 11.

Figure 3:
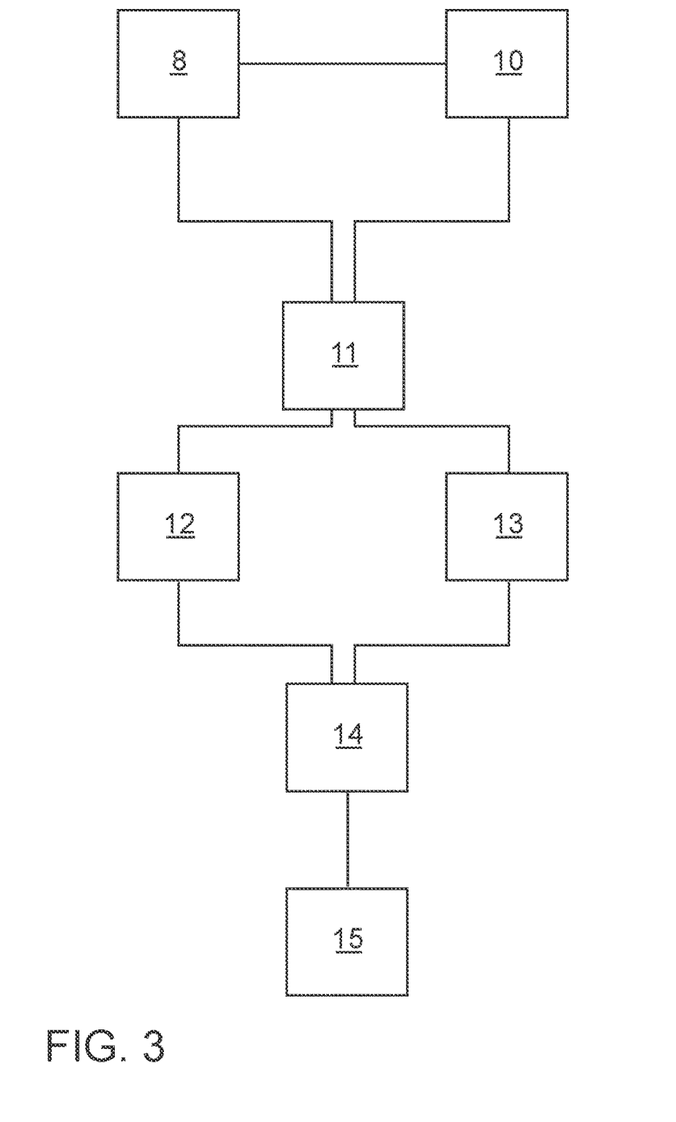
FIG. 3 schematically shows an exemplary embodiment of a device for generating a parameter set.

With reference to FIG. 3, an exemplary embodiment of a device for generating a parameter set for a neural network is described:

The device comprises the database 8 with digital images. The generator 10 described with reference to FIG. 1 is connected to this database 8. A neural network 11 is coupled to the database 8 and the generator 10. The output of the neural network 11 is coupled to a first analysis unit 12 and a second analysis unit 13. The first analysis unit 12 generates a first analysis by means of the neural network 11 on the basis of digital images which are fed to the neural network 11 as input data from the database 8. The second analysis unit 13 generates a second analysis on the basis of disturbed input data 9 that are fed to the neural network 11 from the generator 10. To generate the disturbed input data 9, the generator 10 accesses the database 8 with the digital images and applies the target disturbance generated by the generator 10 to these images.

The first analysis unit 12 and the second analysis unit 13 are coupled to a comparison unit 14. This is designed to compare the first and the second analysis with each other.

The comparison unit 14 is coupled to a parameter set generating unit 15. The parameter set generating unit 15 is designed to generate an improved parameter set for the neural network 11 on the basis of the result of the comparison of the first and the second analysis, which was transferred by the comparison unit 14. The parameter set for the neural network 11 is generated by the parameter set generating unit 15 so that the disturbed input data 9, generated by the generator 10, of the digital images have a low influence on the analysis of this input data by means of the neural network 11. In particular, the improved parameter set is generated so that the effects of the disturbed input data 9 on the semantic segmentation of the digital image by means of the neural network 11 for the disturbed input data does not lead to objects that are relevant for the safety of a driver assistance system being falsely classified, these objects disappearing or being shown in a changed manner. The neural network 11 may thus be trained by means of the disturbed input data 9 which are generated by the generator 10.

Figure 4:
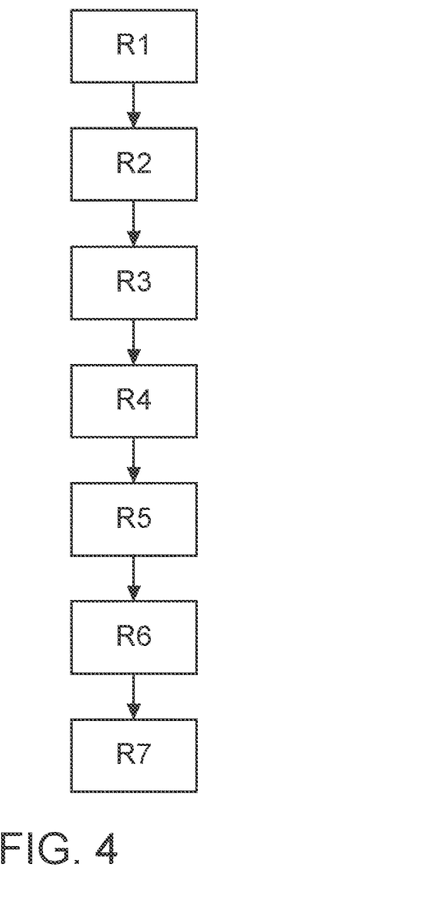
FIG. 4 schematically shows an exemplary embodiment of a method for checking the robustness of a neural network.

With reference to FIG. 4, an exemplary embodiment of the method for checking the robustness of a neural network is described:

In a step R1, a neural network with an associated parameter set is provided. This neural network should be checked.

In a step R2, training data is generated by means of a plurality of digital images.

In a step R3, the neural network is trained with training data in a generally known manner and a first analysis of the digital images is generated on the basis of the training data by mean of the neural network.

In a step R4, disturbed input data is generated as training data for the digital images by means of the method, as it has been explained with reference to FIG. 2.

In a step R5, a second analysis of the digital images is generated on the basis of the disturbed input, meaning on the basis of the digital images to which the target disturbance has been applied, by means of the neural network.

In a step R6, the first and the second analysis are compared with each other.

In a step R7, a robustness value depending on the result of the comparison of the first and second analysis is finally ascertained. The robustness value is high of the deviation if the second analysis from the first analysis is low, in particular with regard to deviations that are relevant, in particular critical for safety, for the operation of a driver assistance system.

Figure 5:
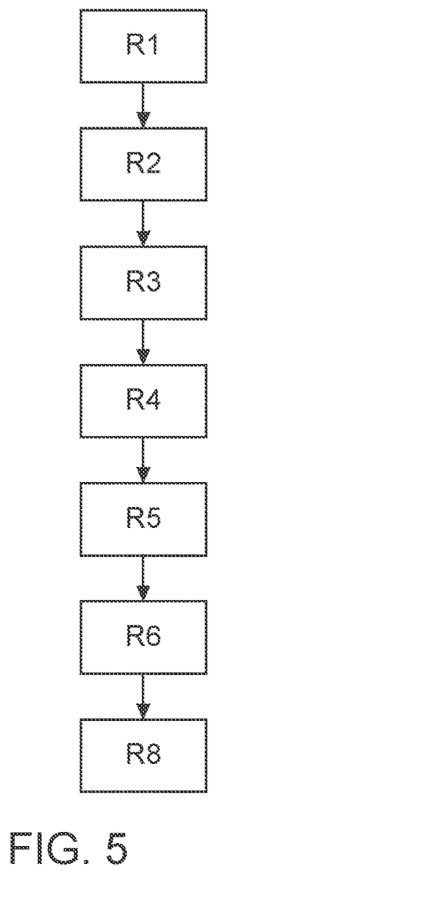
FIG. 5 schematically shows an exemplary embodiment of a method for improving a parameter set of a neural network.

With reference to FIG. 5, a method for improving a parameter set of a neural network is described:

First, the steps R1 through R6 are performed, as it has been explained with reference to FIG. 4. Then, in a step R8, an improved parameter set for the neural network is generated on the basis of the result of the comparison of the first and second analysis.

LIST OF REFERENCE NUMERALS

1 First metric unit
2 Second metric unit
3 Third metric unit
4 Processing unit
5 Solution unit
6 Database with solution algorithms
7 Generating unit
8 Database with digital image data
9 Disturbed input data
10 Generator
11 Neural network
12 First analysis unit
13 Second analysis unit
14 Comparison unit
15 Parameter set generating unit
16 Database with disturbance The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for generating disturbed input data for a neural network for analyzing sensor data of a driver assistance system, which sensor data represent a plurality of digital images, the method comprising:
    generating a first metric, which indicates a magnitude of a change in the sensor data, wherein two digital images of the sensor data are compared and an image distances value is provided as part of the first metric;
    detecting and classifying one or more objects;
    generating a second metric, which indicates where a disturbance of the sensor data is directed to, wherein the second metric is directed at a change of a first object of a specific class;
    wherein the first metric and the second metric indicate change of the one or more digital images;
    generating an optimization problem from a combination of the first metric and the second metric, wherein the optimization problem comprises a loss function for a neural network which comprises as parameters a disturbance parameter and an image resulting from the disturbance according to the second metric, wherein in the optimization problem the minimum of the disturbance parameter is found under the condition that the extent of the change in the generated image relative to the initial image according to the first metric is below a predefined value;
    solving the optimization problem using at least one solution algorithm, wherein the solution indicates a target disturbance of the input data; and
    generating, using the target disturbance, disturbed input data comprising changed digital images for the neural network.

2. The method of claim 1, wherein the second metric is directed at a change in the classification of objects.

3. The method of claim 1, wherein the second metric is directed at a disappearance of objects.

4. The method of claim 1, wherein the disturbances that are described by one or more of the first and the second metric are naturally occurring disturbances.

5. The method of claim 4, wherein
    one or more of the first and the second metrics are stored in a database; and
    a data set on a naturally occurring disturbance that is measured with one or more of the first and the second metric is loaded from the database.

6. The method of claim 1, wherein
    a third metric is defined, which indicates what kind of sensor data a disturbance is applied to; and
    the optimization problem is generated from a combination of at least two metrics of the first, the second, and the third metric.

7. The method of claim 6, wherein the third metric relates to all sensor data.

8. The method of claim 6, wherein the third metric relates only to a subset of the sensor data.

9. The method of claim 6, wherein the third metric describes only sensor data that contain a specific object.

10. The method of claim 1, wherein the solution algorithm comprises iterative methods using the gradients of the neural network for determining the change directions.

11. A method for checking the robustness of a neural network for analyzing sensor data against disturbed input data, which sensor data represent a plurality of digital images, comprising:
providing a neural network with an associated parameter set;
generating training data using an example sensor data set;
generating a first analysis of the example sensor data set on the basis of the training data using the neural network;
generating disturbed input data as training data for the example sensor data set using the method of claim 1;
generating a second analysis of the example sensor data set on the basis of the disturbed input data using the neural network;
comparing the first and second analysis; and
determining a robustness value depending on the result of the comparison of the first and second analysis.

12. A method for improving a parameter set of a neural network for analyzing sensor data in relation to disturbed input data, which sensor data represent a plurality of digital images, comprising:
providing a neural network with an associated parameter set;
generating training data using an example sensor data set;
generating a first analysis of the example sensor data set on the basis of the training data using the neural network;
generating disturbed input data as training data for the example sensor data set using the method of claim 1;
generating a second analysis of the example sensor data set on the basis of the disturbed input data using the neural network;
comparing the first and second analysis; and
generating an improved parameter set for the neural network on the basis of the result of the comparison of the first and second analysis.

13. A method for generating disturbed input data for a neural network for analyzing sensor data of a driver assistance system, which sensor data represent a plurality of digital images, comprising:
generating a first quantity of first metrics, which each differently indicate how a magnitude of a change in the sensor data is measured, wherein two digital images of the sensor data are compared and an image distances value is provided as part of the first metric;
detecting and classifying one or more objects;
generating a second quantity of second metrics, which each differently indicate where a disturbance of the sensor data is directed to, wherein the second metric is directed at a change of a first object of a specific class;
selecting any combination of a first metric from the first quantity and a second metric from the second quantity;
generating an optimization problem from the chosen combination of first and second metric, wherein the optimization problem comprises a loss function for a neural network which comprises as parameters a disturbance parameter and an image resulting from the disturbance according to the second metric, wherein in the optimization problem the minimum of the disturbance parameter is found under the condition that the extent of the change in the generated image relative to the initial image according to the first metric is below a predefined value;
solving the optimization problem using at least one solution algorithm, wherein the solution indicates a target disturbance of the input data; and
generating, using the target disturbance, disturbed input data from sensor data for the neural network.

14. The method of claim 13, wherein the first quantity comprises at least two, in particular at least five, different first metrics.

15. The method of claim 13, wherein the second quantity comprises at least two, in particular at least five, different second metrics.

16. The method of claim 13, comprising:
using a third metric, which indicates what kind of sensor data a disturbance is applied to;
selecting any combination of a first metric of the first quantity, a second metric of the second quantity, and the third metric; and
generating an optimization problem from the chosen combination of the first, second, and third metric.

17. The method of claim 13, comprising:
using a solution algorithm quantity that contains multiple solution algorithms that each solve the optimization problem differently in order to generate different target disturbances of the input data; and
selecting any solution algorithm of the solution algorithm quantity in order to generate disturbed input data from sensor data for the neural network.

18. A generator system for generating disturbed input data for a neural network for analyzing sensor data of a driver assistance system, which sensor data represent a plurality of digital images, the generator system comprising:
a first metric, which indicates a magnitude of a change in the sensor data, wherein two digital images of the sensor data are compared and an image distances value is provided as part of the first metric;
a second metric, which indicates where a disturbance of the sensor data is directed to, wherein the second metric is directed at a change of a first object of a specific class, wherein one or more objects are detected and classified;
wherein the first metric and the second metric indicate change of the one or more digital images;
one or more processors, which are configured to:
generate an optimization problem from the first and the second metric, wherein the optimization problem comprises a loss function for a neural network which comprises as parameters a disturbance parameter and an image resulting from the disturbance according to the second metric, wherein in the optimization problem the minimum of the disturbance parameter is found under the condition that the extent of the change in the generated image relative to the initial image according to the first metric is below a predefined value;
to solve the optimization problem by means of at least one solution algorithm, wherein the solution indicates a target disturbance of the input data from sensor data; and
using the target disturbance, to generate disturbed input data comprising changed digital images for a neural network.

19. The generator system of claim 18, comprising
a third metric unit with a third metric, which indicates what kind of sensor data the disturbance is applied to,
wherein the processing unit is also coupled to the third metric unit and is designed to generate the optimization problem from at least two metrics of the first, the second, and the third metric.

20. A generator system for generating disturbed input data for a neural network for analyzing sensor data of a driver assistance system, which sensor data represent a plurality of digital images, with
a first quantity of first metrics, which each differently indicate how a magnitude of a change in the sensor data is measured, wherein two digital images of the sensor data are compared and an image distances value is provided as part of the first metric;
a second quantity of second metrics, which each differently indicate where a disturbance of the sensor data is directed to, wherein the second metric is directed at a change of a first object of a specific class, wherein one or more objects are detected and classified;
one or more processors, which are configured to:
generate an optimization problem from any combination of a first metric of the first quantity and a second metric of the second quantity, wherein the optimization problem comprises a loss function for a neural network which comprises as parameters a disturbance parameter and an image resulting from the disturbance according to the second metric, wherein in the optimization problem the minimum of the disturbance parameter is found under the condition that the extent of the change in the generated image relative to the initial image according to the first metric is below a predefined value;
to solve the optimization problem by means of at least one solution algorithm, wherein the solution indicates a target disturbance of the input data from sensor data, and
to generate disturbed input data from sensor data for a neural network by means of the target disturbance.

\* \* \* \* \*